United States Patent
Boesel et al.

(10) Patent No.: US 9,505,392 B2
(45) Date of Patent: *Nov. 29, 2016

(54) AIR BRAKE LOCK AND ASSEMBLY

(71) Applicant: VSI, LLC, Green Bay, WI (US)

(72) Inventors: Lucas Boesel, Muskego, WI (US); Joshua J. Miller, Milwaukee, WI (US); Daniel Bonness, Menomonee Falls, WI (US)

(73) Assignee: VSI, LLC, Green Bay, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/515,789

(22) Filed: Oct. 16, 2014

(65) Prior Publication Data

US 2015/0107317 A1    Apr. 23, 2015

Related U.S. Application Data

(60) Provisional application No. 61/892,005, filed on Oct. 17, 2013.

(51) Int. Cl.
| | | |
|---|---|---|
| *F16K 35/10* | (2006.01) | |
| *B60T 17/16* | (2006.01) | |
| *B60R 25/08* | (2006.01) | |
| *E05B 37/02* | (2006.01) | |

(Continued)

(52) U.S. Cl.
CPC ............... *B60T 17/16* (2013.01); *B60R 25/08* (2013.01); *B60R 25/00* (2013.01); *B60R 25/02* (2013.01); *B60R 25/021* (2013.01); *E05B 37/025* (2013.01); *E05B 37/12* (2013.01); *E05B 67/00* (2013.01); *E05B 67/003* (2013.01); *E05B 67/02* (2013.01); *Y10T 70/7486* (2015.04)

(58) Field of Classification Search
CPC ............ B60R 25/08; B60R 25/02153; B60R 25/0211; B60R 25/02115; B60R 25/00; B60R 25/02; B60R 25/02105; B60R 25/021; B60R 25/02107; B60R 25/02118; B60R 25/02126; B60R 25/0215; B60T 17/16; Y10T 70/7486; E05B 67/36; E05B 67/02; E05B 67/00; E05B 67/003; E05B 67/383; E05B 37/025; E05B 37/12
USPC ................... 70/175–179, 181–186, 228–232
See application file for complete search history.

(56) References Cited

U.S. PATENT DOCUMENTS 1,881,567 A * 10/1932 Henke, Jr. ............. B62D 43/007
                                                                70/18
2,478,339 A *  8/1949 Sullivan .............. E05B 73/0076
                                                               70/186

(Continued)

*Primary Examiner* — Suzanne Barrett
*Assistant Examiner* — Morgan McClure
(74) *Attorney, Agent, or Firm* — Joseph S. Heino; James E. Lowe

(57) ABSTRACT

An air brake lock assembly helps to prevent air brake actuation knobs from being actuated. The air brake lock in accordance with the present invention is a theft-prevention device that mounts over the air brake knobs on the dash of a semi-truck cab. It is installed between the dash and the knobs and, when locked, the assembly prevents the knobs from being pushed in. If the air brake knobs cannot be pushed back in, the air brake will remain locked and the truck and trailer will remain immobile. In one embodiment of the present invention, the assembly includes a base and an enclosure for each brake knob. An air brake lock is disposed between the knobs such that the knobs can be selectively locked and unlocked. In one embodiment, the assembly is spring-loaded. In another embodiment, the assembly is not spring-loaded.

13 Claims, 11 Drawing Sheets

(51) Int. Cl.
  *E05B 37/12* (2006.01)
  *B60R 25/00* (2013.01)
  *B60R 25/021* (2013.01)
  *E05B 67/00* (2006.01)
  *E05B 67/02* (2006.01)
  *B60R 25/02* (2013.01)

(56) References Cited

U.S. PATENT DOCUMENTS

| | | | | |
|---|---|---|---|---|
| 2,500,375 A * | 3/1950 | Parker | E05B 73/0076 | 70/14 |
| 2,630,698 A * | 3/1953 | Morrow | B62D 53/085 | 280/433 |
| 2,630,699 A * | 3/1953 | Langdon | B62D 53/085 | 280/433 |
| 2,637,789 A * | 5/1953 | Critchfield | B60R 25/007 | 180/69.2 |
| 2,706,392 A * | 4/1955 | Lucas | B62D 53/085 | 280/433 |
| 2,755,655 A * | 7/1956 | Maffey | B62D 53/085 | 280/433 |
| 3,415,085 A * | 12/1968 | Eble, Jr. | B62D 53/085 | 70/232 |
| 3,589,153 A * | 6/1971 | Hill | E05B 27/005 | 70/378 |
| 4,345,447 A * | 8/1982 | Keung | E05B 67/24 | 292/37 |
| 4,422,314 A * | 12/1983 | Cooper | B60R 25/042 | 137/382 |
| 4,553,415 A * | 11/1985 | Maffey | B62D 53/085 | 70/232 |
| 4,697,444 A * | 10/1987 | Maffey | B62D 53/085 | 70/232 |
| 5,214,945 A * | 6/1993 | Martin | B62D 53/085 | 70/167 |
| 5,375,916 A * | 12/1994 | Cook | B60R 25/08 | 303/89 |
| 5,440,904 A * | 8/1995 | Su | B62H 5/003 | 70/18 |
| 5,511,399 A * | 4/1996 | Lynn | B62H 5/08 | 180/219 |
| 5,560,233 A * | 10/1996 | Watkins | B60R 25/007 | 137/383 |
| 5,688,027 A * | 11/1997 | Johnson | B60T 17/16 | 188/353 |
| 5,735,147 A * | 4/1998 | Cattanach | B60R 25/08 | 137/382 |
| 5,813,256 A * | 9/1998 | von Hagen | B60R 25/007 | 70/167 |
| 5,823,025 A * | 10/1998 | Phifer | B62H 5/08 | 70/226 |
| 5,966,970 A * | 10/1999 | Mooney | B60R 25/042 | 137/384.6 |
| 6,101,852 A * | 8/2000 | Steinbach | E05B 67/06 | 70/38 A |
| 6,161,402 A * | 12/2000 | Moore | B62D 53/085 | 70/14 |
| 6,178,789 B1 * | 1/2001 | Finkelstein | E05B 13/106 | 70/210 |
| 6,789,856 B2 * | 9/2004 | Bottiglieri | B60T 17/22 | 137/556 |
| 6,848,282 B2 * | 2/2005 | Palzkill | B62D 53/085 | 70/14 |
| 6,964,459 B2 * | 11/2005 | Cormier | B60R 25/08 | 303/89 |
| 7,677,068 B2 * | 3/2010 | Alaniz | B60R 25/08 | 303/89 |
| 2003/0041634 A1 * | 3/2003 | Lenz | B60R 25/08 | 70/178 |
| 2004/0221627 A1 * | 11/2004 | Cormier | B60R 25/08 | 70/177 |
| 2005/0252256 A1 * | 11/2005 | Escalante | B60D 1/60 | 70/14 |
| 2013/0067966 A1 * | 3/2013 | Wheeler | E05B 67/003 | 70/15 |
| 2015/0013399 A1 * | 1/2015 | Young | E05B 67/063 | 70/35 |
| 2015/0040622 A1 * | 2/2015 | Meersschaert | E05B 35/105 | 70/69 |

\* cited by examiner

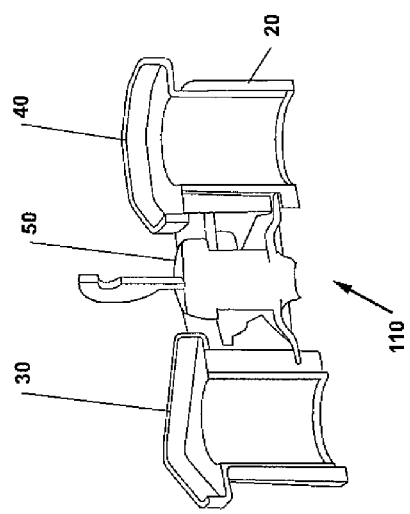
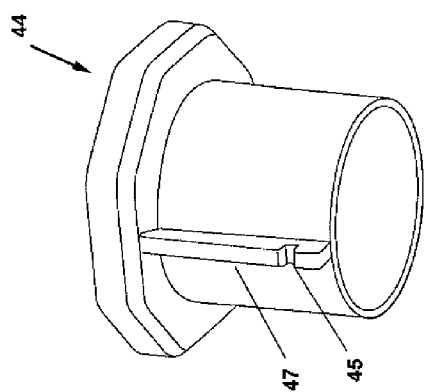
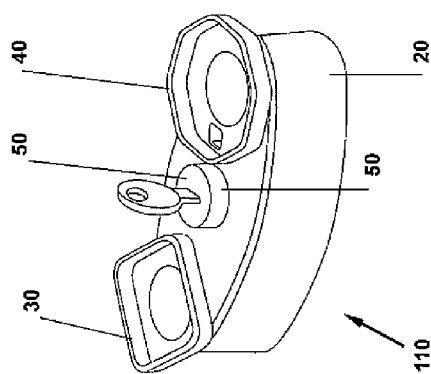
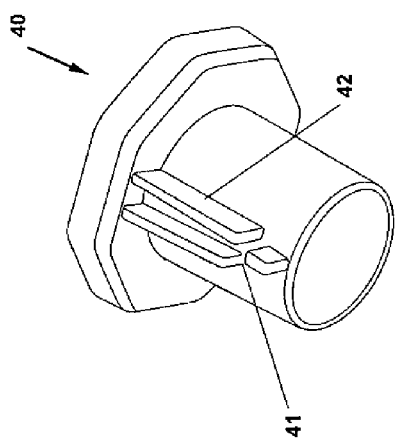

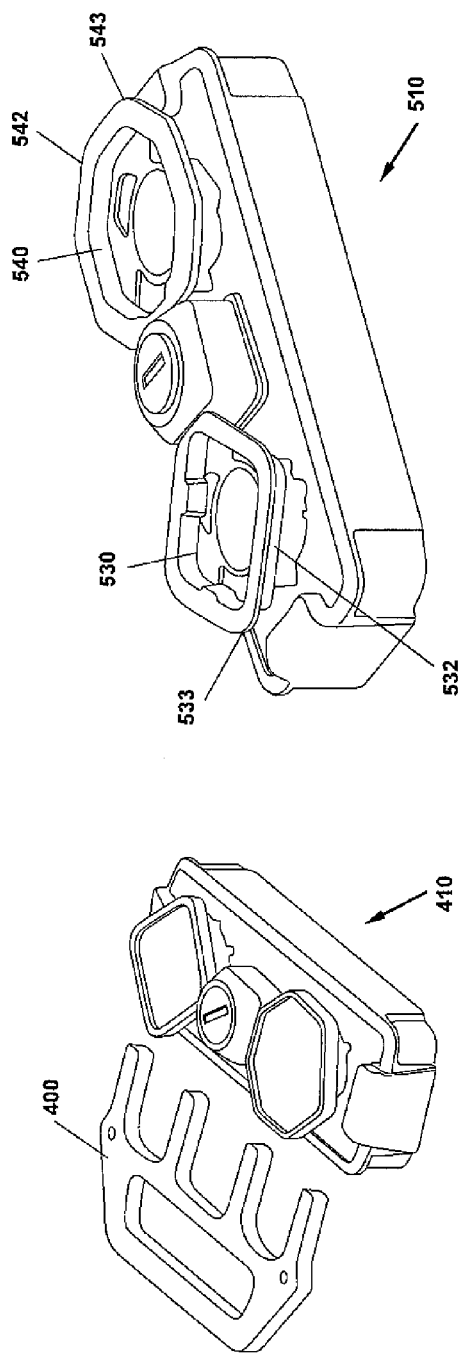
FIG. 27
FIG. 26
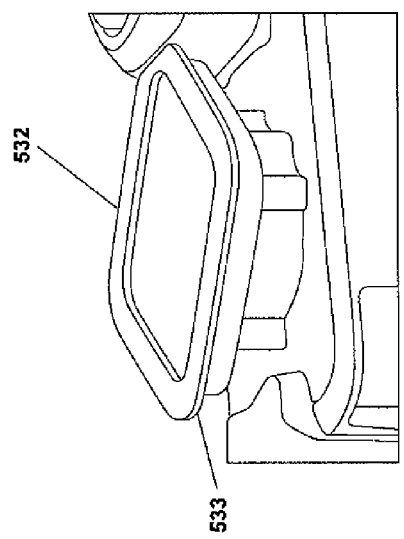
FIG. 28

AIR BRAKE LOCK AND ASSEMBLY

This Application claims the benefit of U.S. Provisional Application No. 61/892,005, filed Oct. 17, 2013.

FIELD OF THE INVENTION

The present invention relates generally to locks and to other security devices that use locks and locking mechanisms. The present invention also relates to air brakes and air brake securing devices. More specifically, the present invention relates to a tamper-proof air brake securing device and assembly that is used with air brake control knobs of the type that are mounted to the dashboard of a tractor vehicle and are used to release the air brakes of the vehicle, which brakes are used to hold a parked tractor, or a parked tractor-trailer combination, against movement.

BACKGROUND OF THE INVENTION

Air brakes have long been used on heavy duty vehicles for purposes of efficiency and ease of replenishment, since air is always available. In the case of air brakes, pressurized air is used for braking and for preventing vehicles from being moved. In the case of the latter, air brakes prevent vehicle movement by locking the wheels of the vehicle. Such air brakes are set or engaged typically by pulling an air control knob of the air brake plunger outwardly from the dashboard and disengaged by pushing the knob inward or toward the dashboard. Two knobs are typically provided. One knob controls the brakes of the tractor. The other knob controls the brakes of the trailer. The function of the knobs is to control the flow of air for setting or releasing the parking brakes.

One problem with such air brake systems is that the air brake actuation knobs can be tampered with. In order to prevent this type of tampering, devices have been attempted in an effort to disable or prevent each control knob from being actuated.

SUMMARY OF THE INVENTION

What is needed is a device or assembly for securely and inexpensively locking the air brake actuation knobs to prevent the knobs from being actuated. The present invention provides such an assembly that, when used properly, helps to prevent the air brake actuation knobs from being actuated. The present invention provides for a unique locking assembly having a number of components that form such assembly. The air brake lock in accordance with the present invention is a theft-prevention device that mounts over the air brake knobs on the dash of a semi-truck cab. The air brake lock assembly of the present invention is installed between the dash and the knobs and, when locked, the assembly prevents the knobs from being pushed in. If the air brake knobs cannot be pushed back in, the air brake will remain locked and the truck and trailer will remain immobile. In one embodiment of the present invention, the assembly includes a base and an enclosure for each brake knob. An air brake lock is disposed between the knobs such that the knobs can be selectively locked and unlocked. In one embodiment, the assembly is spring-loaded. In another embodiment, the assembly is not spring-loaded. Other alternative embodiments are disclosed as well, all with the goal of creating a product that is easy to install and easy to operate. Features of one alternative embodiment may also be incorporated into another embodiment and such is not a limitation of the present invention.

The foregoing and other features of the air brake lock assembly of the present invention will be apparent from the detailed description that follows.

BRIEF DESCRIPTION OF THE DRAWINGS

FIG. 9 is a perspective view of the second embodiment of an air brake locking assembly that is constructed in accordance with the present invention.

FIG. 10 is a perspective view of the assembly shown in FIG. 9 and illustrating a cross-sectioned view of the assembly structure.

FIG. 11 is an enlarged perspective view of a first knob enclosure constructed in accordance with the present invention.

FIG. 12 is an enlarged perspective view of a second knob enclosure constructed in accordance with the present invention.

FIG. 26 is a top perspective view of the assembly shown in FIG. 21 and illustrating an installation shim used with the assembly.

FIG. 27 is top perspective view of a fifth embodiment of an air brake lock assembly that is constructed in accordance with the present invention.

FIG. 28 is a greatly enlarged view of one of the knob enclosures of the assembly shown in FIG. 27.

DETAILED DESCRIPTION OF THE INVENTION

Figure 1:
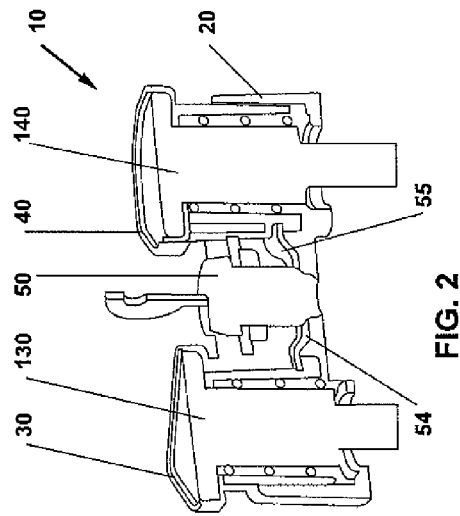
FIG. 1 is a top perspective view of the first embodiment of an air brake lock assembly that is constructed in accordance with the present invention.
Figure 13:
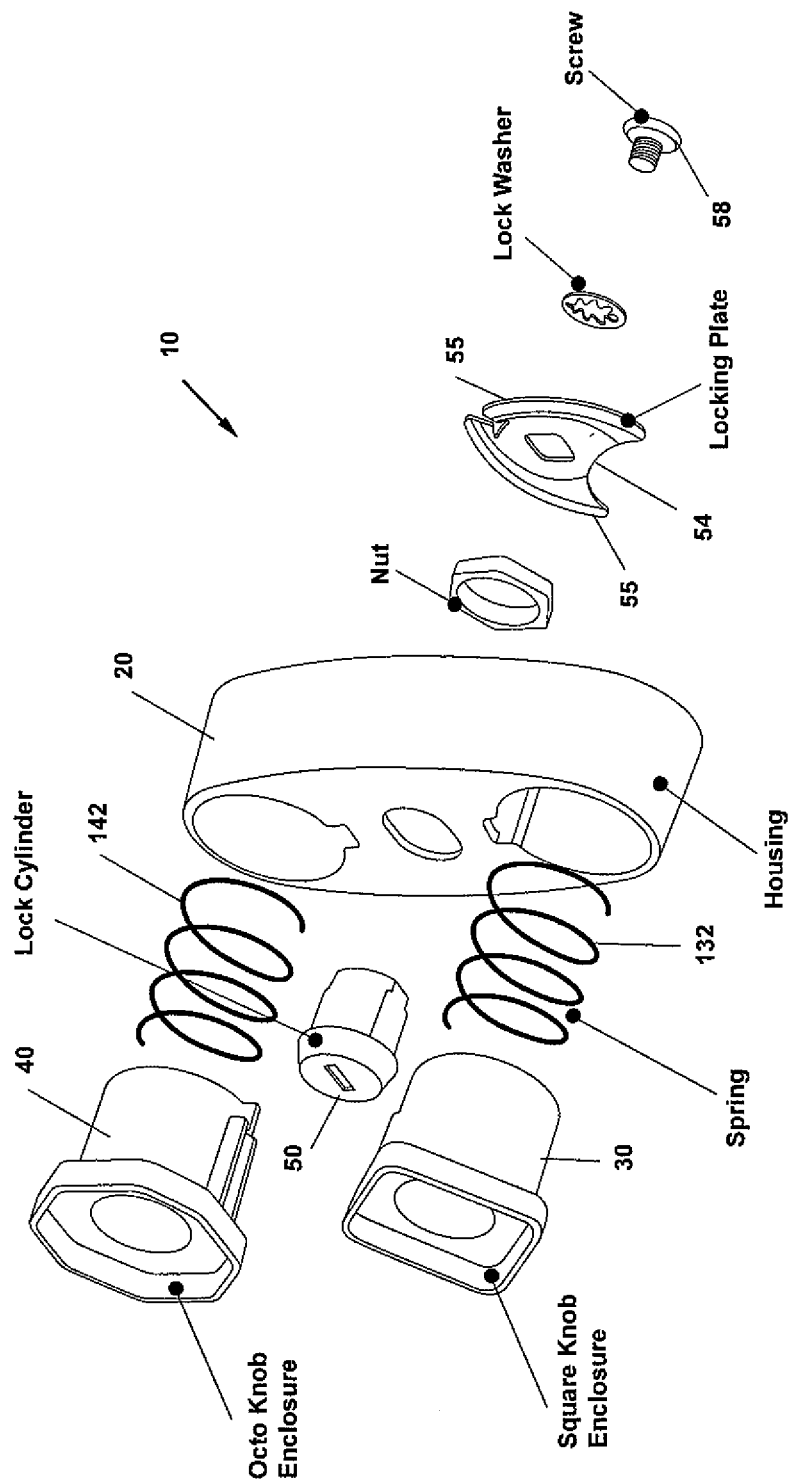
FIG. 13 is a further enlarged and exploded perspective view of the assembly shown in FIG. 1.

Referring now to the drawings in detail, FIG. 1 is a perspective view showing a portion of a first preferred embodiment of the air brake lock assembly, generally identified 10, that is constructed in accordance with the present invention. FIG. 13 is an exploded perspective view of the same assembly 10. Unlike an air brake button housing of the type that is known in the art, the assembly 10 is composed of a knob enclosure 30, 40 for each knob 130, 140, respectively, a lock subassembly 50 and a housing 20 that packages all of these components. Conventionally, there is provided a square knob enclosure 30 and an octagonal knob enclosure 40, the respective knobs 130, 140 being associated with them. The square knob 130 is used to control the brakes of the semi-truck and is yellow in color whereas the octagonal knob (or "octo knob" as may be used herein) is red and is used to control the brakes of the semi-trailer.

The air brake lock assembly 10 is operated by turning a key 51 that is inserted into a lock cylinder 52 of the lock subassembly 50 to provide "locking" and "unlocking" action to the assembly 10. The lock cylinder 52 has a disc shaped locking plate 54 mounted to a bottom or back side 53 of the cylinder 52. See FIGS. 2 and 6. The locking plate 54 is bent in such a way that its cam-like outer edges 55 are inclined creating a helical profile. See also FIG. 7. The locking plate 54 is positioned in the housing 20 so the outer edges 55 of the plate 54 rest in slots 31, 41 that are located on the sides 32, 42 of the knob enclosures 30, 40, respectively. See FIG. 11, for example.

When the lock cylinder 52 is turned 90° back and forth, the outer inclined edges 55 of the locking plate 54 push against the knob enclosures 30, 40, thereby toggling the enclosures "in" and "out." When the knob enclosures 30, 40 are toggled out, the air brake knobs 130, 140 are pushed "out" into the "lock" position. See FIG. 2. When the knob enclosures 30, 40 retract back "in," the knobs 130, 140 can also be pushed back into the "unlocked" position.

Figure 2:
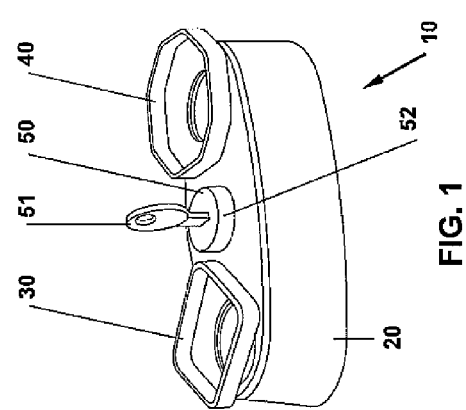
FIG. 2 is a perspective view of the assembly shown in FIG. 1 and illustrating a cross-sectioned view of the assembly structure.
Figure 4:
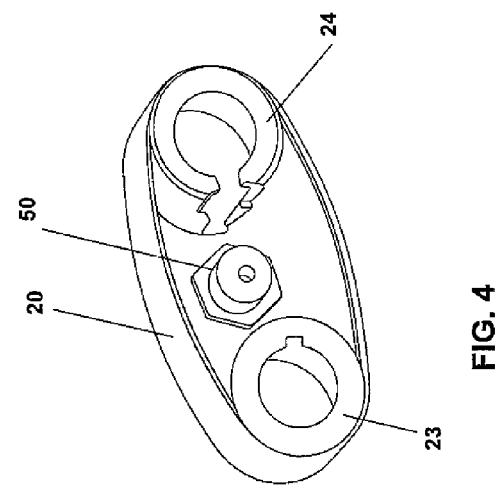
FIG. 4 is a perspective view of the bottom of that portion of the assembly shown in FIG. 3.
Figure 3:
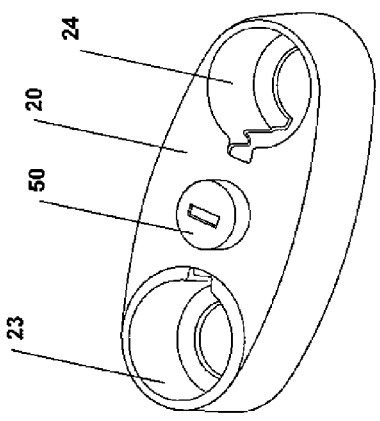
FIG. 3 is a perspective view of the top of a portion of the assembly shown in FIG. 1.
Figure 5:
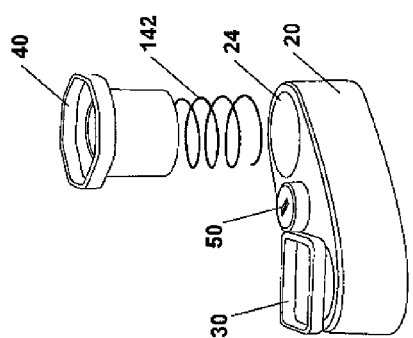
FIG. 5 is another perspective view of the top of the assembly shown in FIG. 1 and showing one knob enclosure and spring in an exploded view.

As illustrated in FIGS. 2 and 5, the first embodiment of the assembly 10 is a spring loaded concept. That is, this first embodiment has springs 132, 142 that provide additional force to push the brake knobs 130, 140 outwardly. In this way, the load on the lock cylinder 52 is reduced, such as where a substantial amount of force is needed to move the air brake levers (not shown) outwardly. As shown, the springs 132, 142 and knob enclosures 30, 40 are placed into two corresponding sockets 23, 24 of the housing 20. See also FIG. 3.

Figure 7:
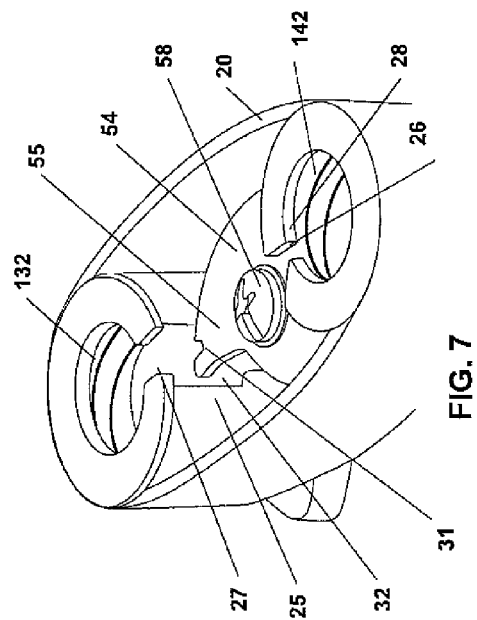
FIGS. 6 and 7 are perspective views of the bottom of the assembly shown in FIG. 1 and showing the locking plate installed in the first embodiment of the assembly.
Figure 6:
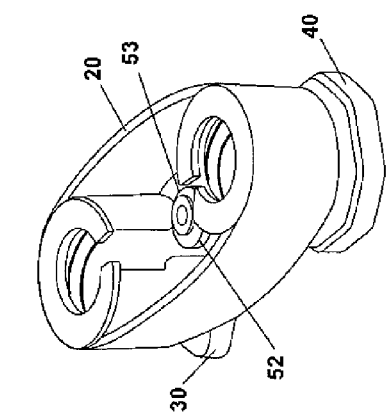

As shown in FIGS. 6 and 7, the housing 20 is then flipped upside-down in order to install the locking plate 54 to the lock cylinder 52. The locking plate 54 drops into the middle of the housing 20 and is then turned to engage the plate edges 55 with the corresponding slots 31, 41 on the knob enclosures 30, 40. The locking plate 54 is then secured with a machine screw or other fastener 58 which threads into the back of the lock cylinder 52. The installed locking plate 54 retains the knob enclosures 30, 40 and springs 132, 142, respectively, in the housing 20. It should also be noted in FIG. 7 that each of the sockets 23, 24 includes an inwardly curved portion 25, 26, respectively, the curved portions 25, 26 further comprising openings 27, 28. It is the openings 27, 28 that allow a portion of the knob enclosures 30, 40 to be exposed such that the outer edges 55 of locking plate 54 can engage them.

Figure 8C:
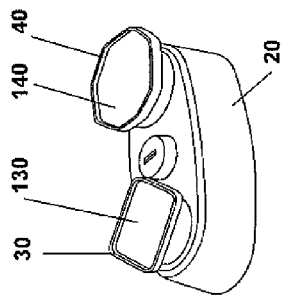
FIGS. 8A through 8C are perspective views showing the steps in assembly of the brake lever knobs in accordance with the present invention.
Figure 8B:
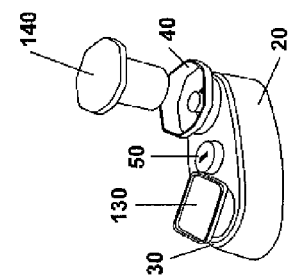
Figure 8A:
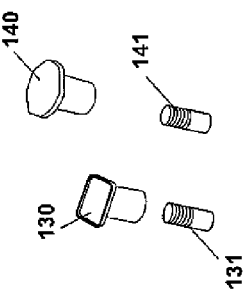

As illustrated in FIGS. 8A through 8C, the knobs 130, 140 of the brake levers are unscrewed from each respective shaft 131, 141. With the lock assembly 10 in the unlocked position, the housing 20 slides over lever shafts 131, 141, and the knobs 130, 140 are screwed back down. When the lock cylinder 52 is returned to the locked position, the knob enclosures 30, 40 advance up and around the respective knobs 130, 140, preventing them from turning and becoming unscrewed.

Where the force needed to push the levers out is small enough, additional springs may not be needed to reduce the load on the lock cylinder 52. In this case, which is a second embodiment of the assembly, generally identified 110, the springs can simply be eliminated, which will result in the entire package being slightly more compact. See FIGS. 9 and 10. The tooling should also be a little less complex in this second embodiment, as locating features for the springs are eliminated from other components. The remainder of the assembly procedure for the "spring-less" design is exactly the same as it is in the spring loaded concept of the first embodiment. The only difference is that the spring installation step is omitted.

Lastly, there are several options for molding the knob enclosures 30, 40. For example, one enclosure 140 design that is shown in FIG. 11 requires slightly more complex and expensive tooling that uses shutoffs to create the undercut slot 41 on the side 42, but doesn't require any secondary operations. Another enclosure 44 design requires much less complex tooling without any shutoffs. This design, however, does require an additional secondary operation to cut the slot 45 in the side 47 after the part is molded.

Figure 16:
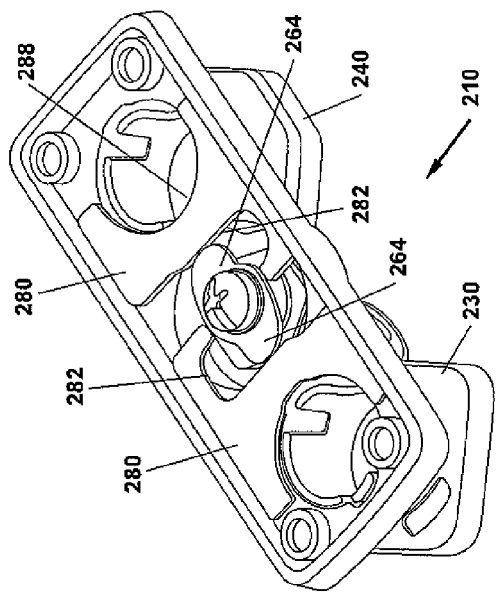
FIG. 16 is a bottom perspective view of a portion of the assembly shown in FIG. 14.
Figure 14:
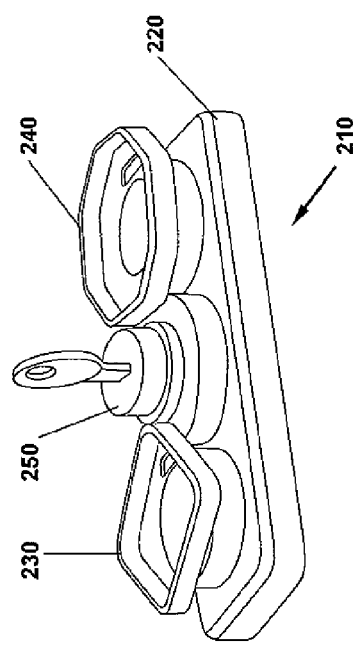
FIG. 14 is a top perspective view of a second embodiment of an air brake lock assembly that is constructed in accordance with the present invention.
Figure 17:
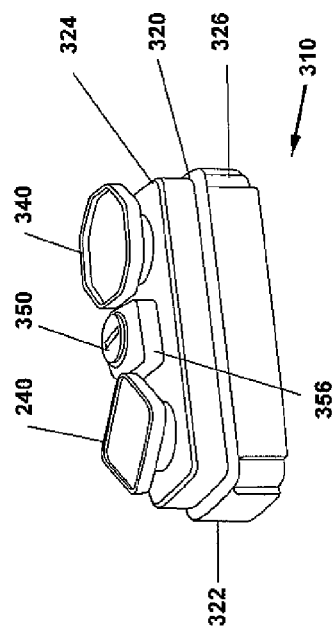
FIG. 17 is a top perspective view of a third embodiment of an air brake lock assembly that is constructed in accordance with the present invention.
Figure 15:
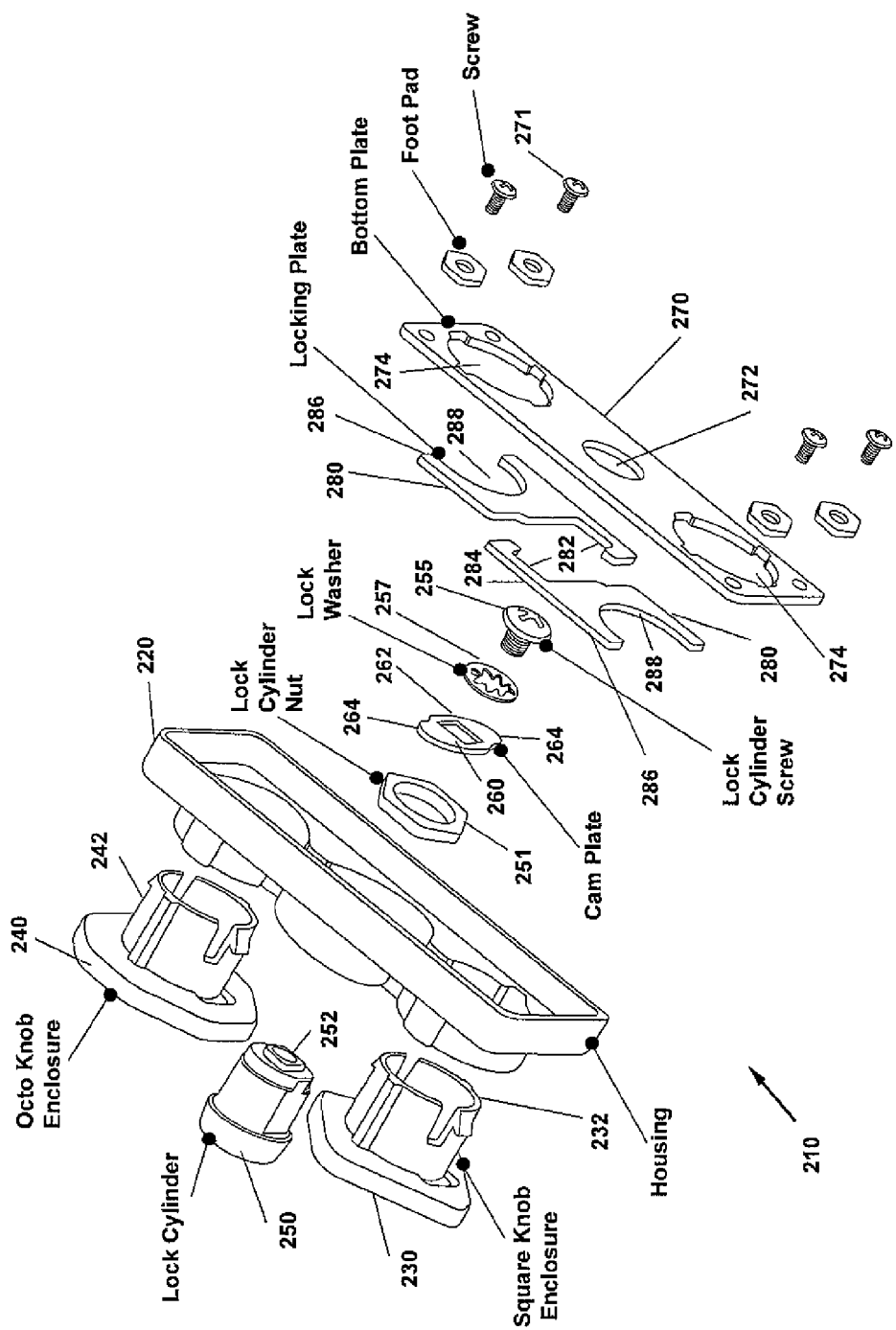
FIG. 15 is an exploded perspective view of the assembly shown in FIG. 14.

Referring now to FIGS. 14 to 16, a third preferred embodiment of the air brake lock assembly, generally identified 210, that is constructed in accordance with the present invention is illustrated. Specifically referring to FIG. 16, it will be seen that the assembly 210 comprises a "sliding lock plate" configuration. This embodiment is similar to the prior embodiments in that the assembly 210 includes a housing 220, a square knob enclosure 230, an octo knob enclosure 240 and a lock cylinder 250. Referring now to FIG. 15, it will be seen that the lock cylinder 250 includes a central portion that can be used to secure the lock cylinder 250 to the housing 220 using a lock cylinder nut 251 that is disposed to the inner side of the housing 220. The lock cylinder 250 also comprises a bottom portion, or "tail," 252 that is shaped to engage an aperture 262 defined within a cam plate 260. The cam plate 260 is secured to the tail 252 of the lock cylinder 250 using a lock cylinder screw 255 and a lock washer 257, or other suitable fastening means.

The assembly 210 further comprises a bottom plate 270 which effectively "captures" two locking plates 280 within the housing 220. The bottom plate 270 is affixed to the housing 220 by use of fasteners, such as screws 271. The bottom plate 270 has a central aperture 272 that is flanked to each side with opposing side apertures 274. The side apertures 274 are profiled to match the shaft profiles of the knob enclosures 230, 240 such that the shafts 232, 242 of the knobs 230, 240 can pass through them. Disposed between the bottom plate 270 and the housing 220 are the locking plates 280, each plate 280 has somewhat of an H-shape to it and is identically configured to the other.

Referring now to FIG. 15, it illustrates the parts whereby the locking plates 280 are captured within the housing 220. As shown, the cam plate 260 is mounted to the tail 252 of the lock cylinder 250. The cam plate 260 has cam-like outer edges 264 that functionally cooperate with apertures 282 disposed at a first side 284 of each locking plate 280. Each locking plate 280 further comprises an opposing second side 286 that similarly comprises an aperture 288 defined in it. In application, the cam plate 260 slides the two locking plates 280 back and forth from an unlocked position to a locked position. With that action, the second side 286 of each locking plate 280 slides under a knob enclosure 230, 240 to prevent the knobs (not shown) from being pushed downward.

Figure 18:
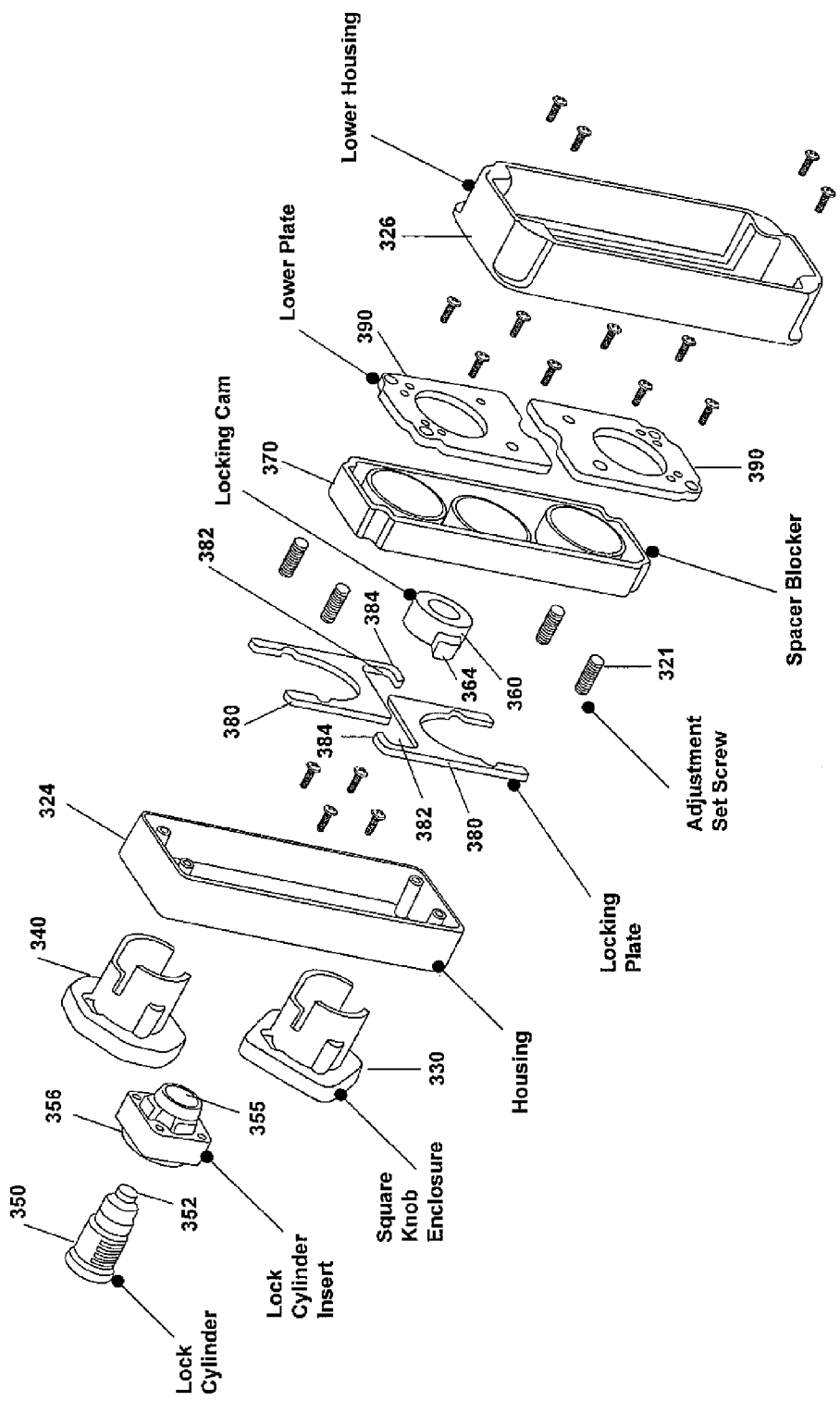
FIG. 18 is an exploded perspective view of the assembly shown in FIG. 17.

Referring now to FIGS. 17 to 20, a fourth preferred embodiment of the air brake lock assembly, generally 310, that is constructed in accordance with the present invention is illustrated. The assembly 310 of the fourth preferred embodiment comprises an adjustable height arrangement. This embodiment likewise has a housing 320, which comprises a housing subassembly 322 having an upper housing 324 and a lower housing 326. The assembly 310 also comprises a square knob enclosure 330, an octo knob enclosure 340, a lock cylinder 350 and a lock cylinder insert 356. Referring now to FIG. 18, it will be seen that the lock cylinder 350 is inserted into the circular aperture 355 of the cylinder insert 356, the cylinder insert 356 fitting within an aperture (not shown) of the housing 310 and extending into the housing 310. As with the prior embodiment, the lock cylinder 350 comprises a tail 352 the end of which is engaged with a locking cam 360. The locking cam 360 is flanked by two locking plates 380, all of which is held in place by a spacer block 370. Lower plates 390 are disposed below the spacer block 370 but within the lower housing 326.

In this configuration, the housing subassembly 322 consists of the upper and lower housings 324, 326, respectively, which can "telescope" in and out from each other to allow for an adjustable height of the housing 320. Set screws 321 located in each of the four corners of the housing subassembly 322 ensure that the housing height can be adjusted and remain secure in a set position. See FIG. 19. The sliding locking plates 380 conceal the set screws 321 when the assembly 310 is in the "locked" position. This ensures the assembly 310 cannot be adjusted to a lower position such that the knobs (not shown) and the air brake security assembly 310 can be removed.

Figure 20:
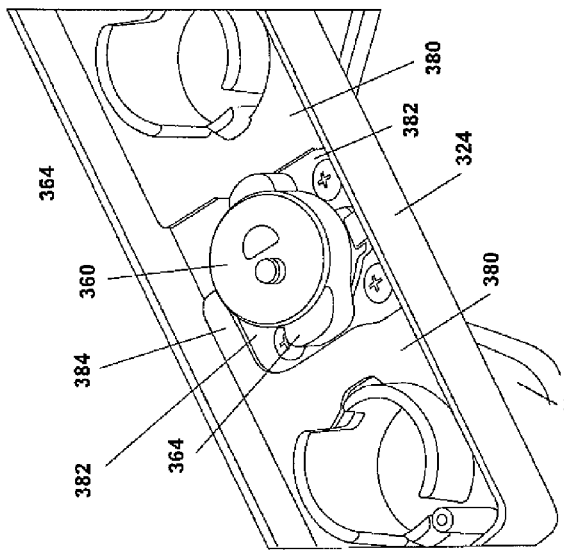
FIG. 20 is a bottom perspective view of a portion of the assembly shown in FIG. 17.
Figure 19:
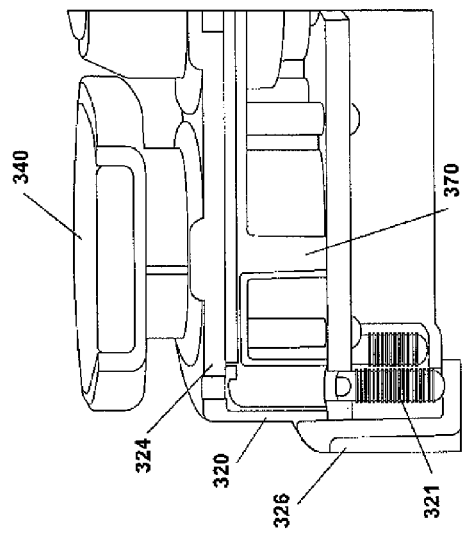
FIG. 19 is an enlarged partial cross-sectioned view of a portion of the assembly shown in FIG. 17.
Figure 21:
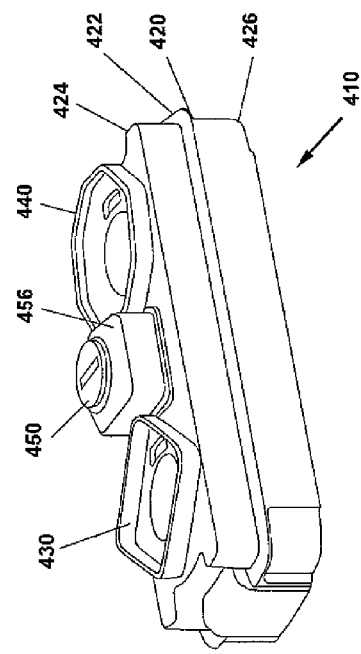
FIG. 21 is a top perspective view of a fourth embodiment of an air brake lock assembly that is constructed in accordance with the present invention.

Referring now to FIG. 20, it shows that the locking cam 360 was modified from a sheet metal plate to a cast or molded cam to provide better contact with the locking plates 380. Functionally, the locking cam 360 and the locking plates 380 operate substantially the same as the prior assembly 210 operated, the locking cam 360 having cam-like outer edges 364 that functionally cooperate with apertures 382 disposed at a first side 384 of each locking plate 380.

Figure 22:
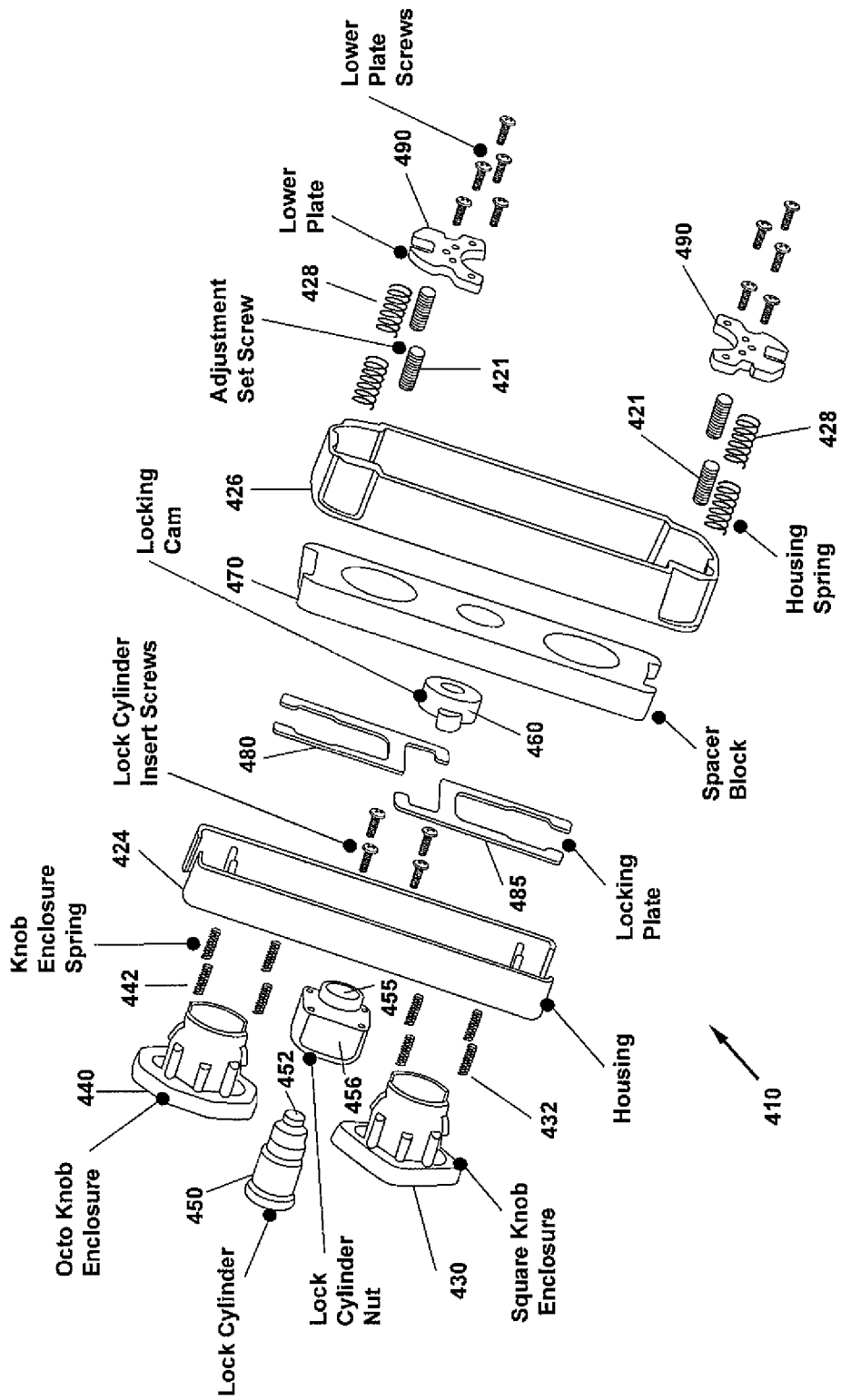
FIG. 22 is an exploded perspective view of the assembly shown in FIG. 21.
Figure 23B:
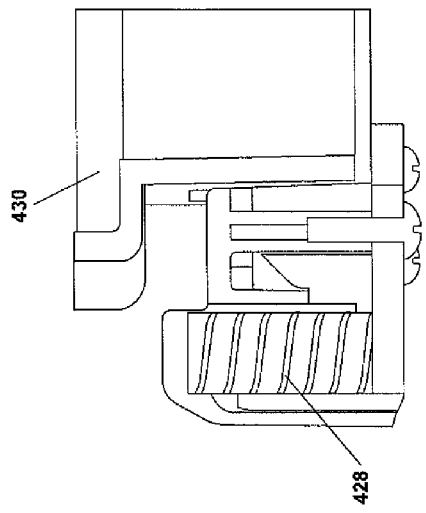
FIGS. 23A and 23B are enlarged partial cross-sectioned views of portions of the assembly shown in FIG. 21.
Figure 25:
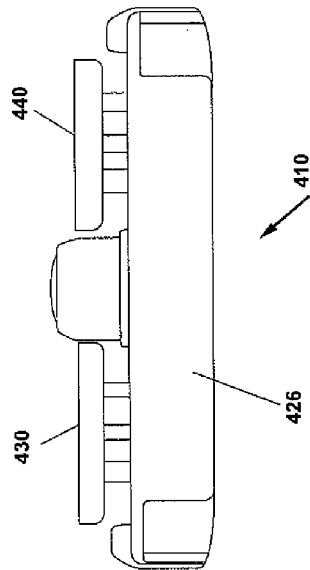
FIG. 25 is a side elevational view of the assembly shown in FIG. 21.
Figure 23A:
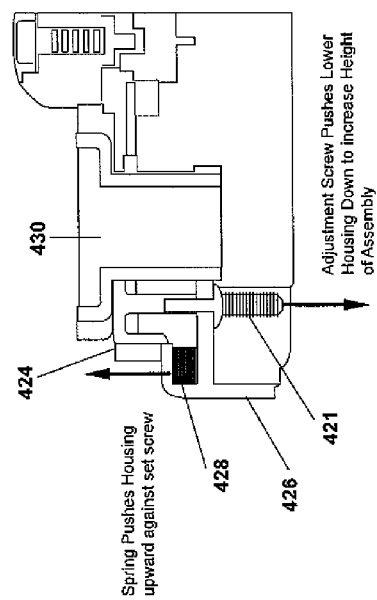

Referring now to FIGS. 21 to 26, a fifth preferred embodiment of the air brake lock assembly, generally 410, that is constructed in accordance with the present invention is illustrated. The assembly 410 of the fifth preferred embodiment comprises a contoured lower housing arrangement. Specifically, this embodiment also has a housing 420, which comprises a housing subassembly 422 having an upper housing 424 and a lower housing 426. The assembly 410 also comprises a square knob enclosure 430, an octo knob enclosure 440, a lock cylinder 450 and a lock cylinder insert 456. Referring now to FIG. 22, it will be seen that the lock cylinder 450 is inserted into the circular aperture 455 of the cylinder insert 456, the cylinder insert 456 fitting within an aperture (not shown) of the housing 420 and extending into the housing 420. As with the prior embodiment, the lock cylinder 450 comprises a tail 452 the end of which is engaged with a locking cam 460. The locking cam 460 has the same two locking plates 480 to either side of it, all of which is held in place by a spacer block 470. These plates 480 function in the same way that their previously-discussed counterparts 280, 380 function relative to the assemblies 210, 310, respectively. Lower plates 490 are disposed below the spacer block 470 but within the lower housing 426.

In this modified configuration, the housing subassembly 422 consists of the upper and lower housings 424, 426, respectively, and housing springs 428 to hold the lower housing 426 tightly against adjustment set screws 421 to prevent the housing 410 from vibrating and moving around. Specifically, the housing springs 428 push the upper housing 424 upwardly against the set screws 421 whereas the adjustment screws 421 push the lower housing 426 downwardly to increase the overall height of the assembly 410. See FIGS. 23A and 23B.

Figure 24:
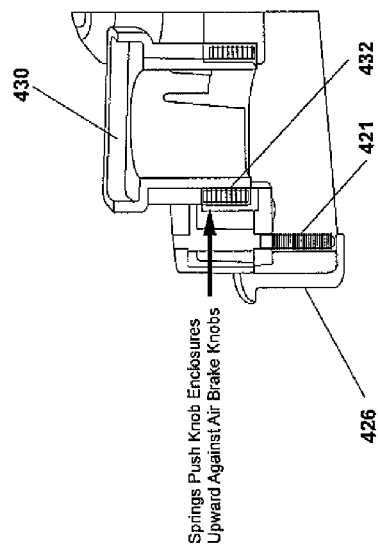
FIG. 24 is another enlarged partial cross-sectioned view of a portion of the assembly shown in FIG. 21.

Further in this embodiment, and as is shown in FIG. 24, knob enclosure springs 432, 442 were added in the housing subassembly 422 to ensure that the enclosures remain seated tightly against the air brake knobs 430, 440. That is, the knob enclosure springs 432, 442 push the knob enclosures 430, 440 upward against the air brake knobs (not shown). It should also be noted that the contour of the lower housing 426 was modified to fit both older and newer Freightliner® truck dashes (FREIGHTLINER is a registered mark of Daimler Trucks North America LLC). See FIG. 25. As shown in FIG. 26, an installation shim 400 is used to ensure that the locking plates 480 are not "pinched" to the point of binding when the housing 410 is adjusted tightly between the knobs and the dash (also not shown).

Referring lastly to FIGS. 27 and 28, a sixth preferred embodiment of the air brake lock assembly, generally 510, that is constructed in accordance with the present invention is illustrated. The assembly 510 of the sixth preferred embodiment comprises a modified knob enclosure arrangement. Specifically, a lip 533, 543 was added to the outer perimeter 532, 542 of the knob enclosures 530, 540, respectively, to provide more material for the operator to grip the knobs (not shown). Snap features (also not shown) were also added to secure the knobs in the knob enclosures 530, 540.

Additional advantages and modifications will readily occur to those skilled in the art. Therefore, the invention in its broader aspects is not limited to the specific details disclosed and described herein. Accordingly, various modifications may be made without departing from the spirit or scope of the general inventive concept.

We claim:

1. An air brake lock assembly comprising:
   a housing;
   a pair of brake knob enclosures;
   a pair of brake knobs;
   a pair of springs, each spring providing a force against one brake knob to urge the respective brake knob upwardly; and
   a lock subassembly, the lock subassembly comprising a lock cylinder having a bottom and a locking plate disposed at the bottom of the lock cylinder.

2. The air brake lock assembly of claim 1 wherein the locking plate comprises at least two outer edges that are inclined in a helical profile.

3. The air brake lock assembly of claim 2 further comprising:
   the housing comprising a central portion and further comprising a socket to either side of the central portion;
   one air brake knob enclosure disposed within each socket of the housing; and each air brake knob enclosure comprising a side and a slot defined within such side, such slot being configured to receive a portion of an outer edge of the locking plate;

wherein the outer inclined edges of the locking plate are positioned to engage and disengage with the slots of the knob enclosures such that the rotation of the helical profiles of the locking plate pushes the knob enclosures in and out, the pushing of the knob enclosures "out" being a lock position for each of the knob enclosures and the pushing of the knob enclosures "in" being an unlocked position for each of the knob enclosures.

4. An air brake lock assembly comprising:

a housing;

a central portion defined within the housing;

a lock subassembly disposed within the central portion of the housing, the lock subassembly comprising a lock cylinder having a bottom and a cam plate disposed at the bottom of the lock cylinder;

a pair of air brake knobs and air brake knob enclosures, one knob enclosure and its corresponding knob being disposed to each side of the lock sub-assembly;

a pair of locking plates, each locking plate comprising a recess; and a housing subassembly comprising:
  an upper housing;
  a spacer blocker disposed below the upper housing;
  a pair of lower plates disposed below the spacer blocker; and
  a lower housing disposed below the lower plates;

wherein the housing subassembly can telescope via set screws to allow for an adjustable height for the housing subassembly.

5. The air brake lock assembly of claim 4 wherein the cam plate comprises a pair of opposing cam-shaped outer edges.

6. The air brake lock assembly of claim 5 wherein each air brake knob enclosure comprises a side and a slot defined within such side.

7. The air brake lock assembly of claim 6 wherein each locking plate is configured to receive a cam-shaped outer edge of the cam plate and to engage the slot defined in the side of the air brake knob enclosure.

8. The air brake lock assembly of claim 7 wherein each locking plate is like shaped.

9. The air brake lock assembly of claim 7 further comprising a bottom plate, the bottom plate capturing the pair of locking plates within the housing.

10. The air brake lock assembly of claim 7 wherein one pair of a knob and knob enclosure is configured as being square to correspond to brakes of a semi-truck and one pair of a knob and knob enclosure is configured as being octagonal to correspond to brakes of a semi-trailer.

11. The air brake lock assembly of claim 10 further comprising housing springs that are used with the set screws.

12. The air brake lock assembly of claim 10 further comprising an installation shim to prevent pinching of the locking plates within the housing.

13. The air brake lock assembly of claim 4 further comprising a pair of springs, each spring providing a force against one brake knob to urge the respective brake knob upwardly.

* * * * *